G. RUSSO.
ARMOR PLATE BOLT.
APPLICATION FILED FEB. 15, 1909.
993,276.
Patented May 23, 1911.
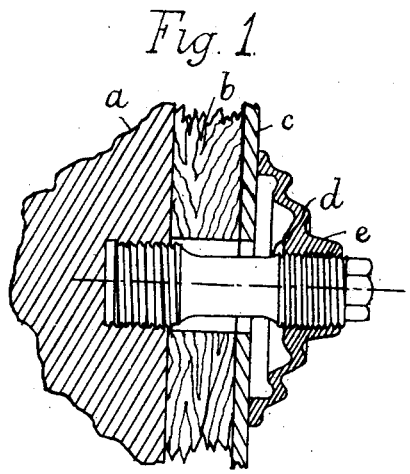
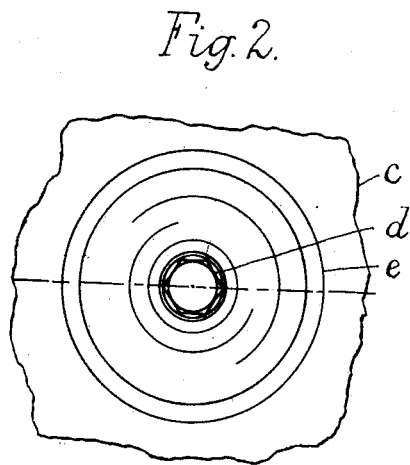
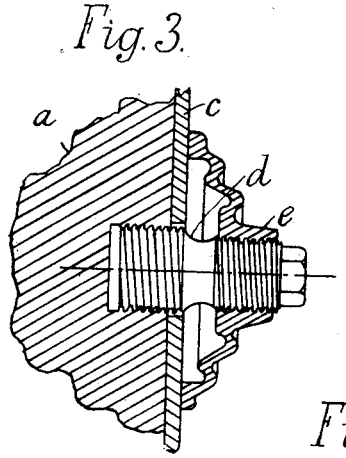
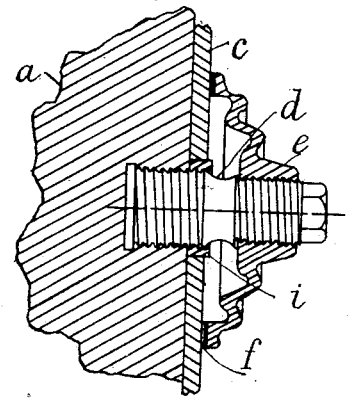
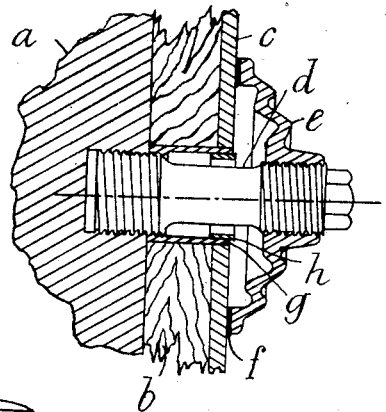

UNITED STATES PATENT OFFICE.

GIOACCHINO RUSSO, OF ROME, ITALY.

ARMOR-PLATE BOLT.

993,276. Specification of Letters Patent. Patented May 23, 1911.

Application filed February 15, 1909. Serial No. 478,107.

*To all whom it may concern:*

Be it known that I, GIOACCHINO RUSSO, a subject of the King of Italy, residing at Rome, in the Kingdom of Italy, have invented new and useful Improvements in Armor-Plate Bolts, of which the following is a specification.

This invention relates to means for securing armor plates to warships, and its object is to provide screw-bolts with an elastic cup-shaped washer for the purpose of lessening or obviating injury to the bolt under the jarring effect of a blow upon the armor and of preventing parts of a broken bolt being violently projected into the interior of the ship, and avoiding the use of a special protecting cap, intermediary washers of rubber or other perishable material, while reducing the weight and space ordinarily required for the usual fastening means. According to this invention differential screw-bolts are used in conjunction with the said cup-shaped washer forming the nut of the bolt. Watertightness may be insured by the application of a sleeve or expanding ring or the like.

Differential screws have been heretofore employed for securing separate parts together, and hollow deformable washers have also been proposed for securing roofing sheets and similar coverings or parts, the combination of differential screw bolt and screwed cup-shaped washer have not been previously provided.

With the ordinary bolt screwed with one of its ends into the armor, a metallic piece, capable of ample elasticity, is interposed according to my invention between the other end of the bolt (whether headed or provided with a nut) and the back of the skin plating, so as to get a sort of elastic connection between the armor (whether provided with wood backing or not) and the hull of the ship.

Armor bolts have ordinarily been provided with india-rubber washers so as to insure an elastic connection. But india-rubber washers are apt to lose their elasticity, while the tension involved seems chiefly responsible for any violent projection of pieces of the bolt, under the jarring effect of a blow upon the armor with consequent damage to material and personnel. An increased length of the bolt shank, as has been proposed, does not appear very effective in giving the required elasticity, owing to the smallness of the elastic elongation, as well as owing to the fact that the violence of the stress probably prevents the elongation reaching the elastic limit. Besides, it is obvious that long bolts require the use of big and heavy sleeves.

With the object of avoiding the aforesaid objections, I adopt the combination of parts hereinafter described with reference to the accompanying drawing in which:

Figure 1 is a transverse section of the armor; Fig. 2 is a plan; Figs. 3, 4 and 5 are transverse sections of modifications.

A combined device according to my invention duly shaped and proportioned for use in fixing armor plates to the skin plating of the ship, furnishes an elastic support which will resist strain at the moment when the armor, after the impact of the shell, is by reason of its own elasticity, violently and instantaneously forced off the hull. The hollow elastic and deformable washer takes all the stress and yields to the pressure (within or beyond its limit of elasticity according to the violence of the blow) before the stress upon the bolt individually attains the elastic limit.

The invention hereinbefore described in general terms may be practically realized, as shown in Figs. 1 and 2 where $a$ represents the armor, $b$ the wood backing, $c$ the skin plating of the hull, $d$ the armor bolt, threaded at both ends and having a suitable head for screwing and adjusting it in position. $e$ is the elastic cup-shaped washer screwed onto and serving as a nut for the inner end of the bolt, said washer being formed with circular undulations or corrugations. The circular lower edge or surface of the said piece is made to fit exactly the back of the skin-plating so that the cup, besides its principal duty, may be reasonably expected to stop any leakage through the submerged armor plates.

The improved device, shown at Figs. 1 and 2, comprises only two parts, viz: the bolt and the cup. The bolt is formed with differential threads at the two ends so as to insure uniform adjustment to the bolt. Supposing the pitch to be 7 mm. at the armor end and 5 mm. at the cup end, at each complete revolution of the bolt the distance between nut and plating becomes 2 mm. shorter. Then, to reach the required adjustment, the bolt is first screwed into the armor with 3 or 4 threads left, before reaching its final position; next the nut is screwed up at the other end of the bolt while the latter is held stationary until the lower edge of the undulated cup fits well against the skin plating. Finally, by the screwing of the bolt up to its final position a further compression of 6 to 8 mm. is obtained, which insures the required fit to the combined device.

The application of the undulated cup *e* enables the device to stand first a considerable elastic stress while the cup itself can deform permanently without breaking, as far as it is necessary even if its central part comes in touch with the skin plating, the stress being inferior to that which the bolt can stand while keeping within its elastic limit. Under these conditions the whole of the armor can safely stand any shock without the bolts breaking; but should the bolt eventually reach the breaking point the break of the bolt takes place while the deformed cup is no longer under elastic tension, so that any violent projection of the broken pieces of the bolt into the hold of the ship is avoided. It follows that a safety or splinter-stopping cap, as employed with armor-bolts of ordinary types, is not required with my combined device. Further, the diameter of the bolts may be made smaller than usual because contrary to the general practice of giving strength to the system by an increase of the diameter of the bolt safety is insured by an increase of elasticity. The reduction of diameter, as well as the great simplicity of the combined device renders the same much cheaper than ordinary screw-fastenings. The cup is not intended to be attached, as a rule, to the hull plating to which it simply fits by its own considerable elasticity, but if desired, it may be tapped in, after the manner of ordinary caps.

Fig. 3 shows the combined device adapted for use with armor having no wood backing. For special purposes a packing *f* may be interposed between the circular edge of the cup and the plating.

In order to prevent leakage of sea water, independently of the tightness of the cup, the circular passage for the bolt through the wood backing may be lined by a metallic sleeve *g* (Fig. 4) screwed to the bolt in such a way as to form a continuation of the threaded hole in the armor, and to fit in the hole of the hull plates. To make this joint absolutely watertight, a ferrule *h* may be forced in permanently, or the top of the sleeve *g* may be slightly burred or expanded in the manner of a boiler tube.

The sleeve *g* becomes a simple ring *i* (Fig. 5) when no wood backing is provided, but it never loses the peculiar feature of being screwed up at the outer end of the bolt.

I claim:

Means for fastening armor plates comprising in combination a differential bolt and a screwed corrugated washer forming the nut of said bolt, as set forth.

GIOACCHINO RUSSO.

Witnesses:
JOHANNES G. MOVRIKS,
ALBERTO GIANNOTTI.

Copies of this patent may be obtained for five cents each, by addressing the "Commissioner of Patents, Washington, D. C."